(12) United States Patent
Wilkinson (10) Patent No.: US 11,266,153 B1
(45) Date of Patent: Mar. 8, 2022

(54) BAKING PAN WITH INTERCHANGEABLE EMBOSSED DESIGNS

(71) Applicant: Wilkinson China Limited, Wanchai (HK)

(72) Inventor: Ian Wilkinson, Wanchai (HK)

(73) Assignee: Wilkinson China Limited, Wanchai (HK)

( * ) Notice: Subject to any disclaimer, the term of this patent is extended or adjusted under 35 U.S.C. 154(b) by 0 days.

(21) Appl. No.: 17/072,497

(22) Filed: Oct. 16, 2020

(51) Int. Cl.
*A21B 3/13* (2006.01)

(52) U.S. Cl.
CPC .............. *A21B 3/135* (2013.01); *A21B 3/136* (2013.01); *A21B 3/137* (2013.01); *A21B 3/138* (2013.01); *A21B 3/139* (2013.01)

(58) Field of Classification Search
CPC ........................................................ A21B 3/135
USPC ............................................................ 99/426
See application file for complete search history.

(56) References Cited

U.S. PATENT DOCUMENTS

| | | | | |
|---|---|---|---|---|
| 5,678,475 A * | 10/1997 | Villar Otero | .......... | A21B 3/137 99/432 |
| 6,053,095 A * | 4/2000 | Ting | .......... | A47J 27/04 99/346 |
| 7,883,290 B1 * | 2/2011 | Ross | .......... | E02D 29/1427 404/25 |
| 8,534,188 B1 * | 9/2013 | Winfield | .......... | A21B 3/137 99/357 |
| 10,028,621 B1 * | 7/2018 | Galik | .......... | A47J 43/28 |
| 2005/0263012 A1 * | 12/2005 | Weld | .......... | A47J 36/06 99/426 |
| 2006/0225579 A1 * | 10/2006 | Errera | .......... | A21C 11/02 99/388 |
| 2008/0173187 A1 * | 7/2008 | Baker | .......... | A47J 37/01 99/422 |
| 2009/0061128 A1 * | 3/2009 | Liu | .......... | A21B 3/138 428/34.4 |
| 2011/0088566 A1 * | 4/2011 | Doxie | .......... | A47J 37/01 99/426 |
| 2017/0030588 A1 * | 2/2017 | Unwin | .......... | F24C 15/16 |

* cited by examiner

*Primary Examiner* — Dana Ross
*Assistant Examiner* — Kuangyue Chen
(74) *Attorney, Agent, or Firm* — Tatonetti IP (57) ABSTRACT

Implemented is a metal baking pan that utilizes a silicone removable base that securely and sturdily engages with a rim on the baking pan's interior surface, in which the removable base includes an embossed design that can be translated to a cake when cake batter is poured into the baking pan. The baking pan includes a cavity that extends from a top side to a bottom side thereof. The baking pan's interior surface is adapted with a protrusion that functions as a rim which extends into and around a perimeter of the cavity. The rim is present so an edge of the removable base can engage with and rest against the rim, thereby making the base removable and creating an ecosystem of bases with different designs that can be used with the baking pan.

14 Claims, 14 Drawing Sheets

BAKING PAN WITH INTERCHANGEABLE EMBOSSED DESIGNS

BACKGROUND

A sector of the home and commercial baking industry uses embossed baking materials to imprint on the top of a cake some aesthetic appearance, such as a slogan like "Happy Birthday" or a clever design such as an airplane. The embossed design can be imprinted into the cake or create a raised surface above the top of the cake to create a three-dimensional appearance. Current solutions to mold the cake include using a metal pan with an embossed bottom that, when the baking process is complete, the user can flip over the cake, so the embossed bottom represents the top of the cake's design.

These methods can be problematic as the cake can be cooked unlevel during the baking process which reflects in a finished molded cake that is likewise unlevel. Furthermore, baking pans with insufficient depth can make molded designs difficult to see inside the cake, and baking pans that utilize too much depth can result in damage to the design when removing the baking pan and flipping the cake over.

SUMMARY

Implemented is a metal baking pan that utilizes a silicone removable base that securely and sturdily engages with a rim on the baking pan's interior surface, in which the removable base includes an embossed design that can be translated to a cake when cake batter is poured into the base and pan. The baking pan includes a cavity that extends from a top side to a bottom side thereof. The baking pan's interior surface is adapted with a protrusion that functions as a rim which extends into and around a perimeter of the cavity.

The rim is present so a perimeter of the removable base can engage with and rest against the rim, thereby making the base removable and creating an ecosystem of bases with different designs that can be used with the baking pan. For example, some bases can show visual designs of virtually anything, including skulls, faces, trees, characters, etc. Alternatively, or in addition, the bases can be designed with slogans or celebratory words, such as "Happy Birthday," "Merry Christmas," "Happy Chanukah," etc. In some scenarios, such as for images, the embossed design on the removable base can be reversible so that a given design can be imprinted into a cake or protruding outward from the cake. Slogans or words are unlikely to be reversible as the wording would be backwards on the finished cake.

The removable base has a lip around its perimeter that engages with the protruding rim on the baking pan's interior surface. At or adjacent to the perimeter of the removable base is a support frame that helps prevent deformability and maintain the base's shape when in use. For example, the support frame can help prevent the removable base, which may be comprised of silicone, from tipping or deforming when cake batter is poured into the baking pan and on top of the base. This can help maintain a level and even design when imprinted into or protruding outward from the cake.

The embossed design in the removable base is for aesthetic purposes to enhance the creativity, excitement, and joy around preparing a cake. In typical implementations, the cake batter is poured into the silicone removable base when the base is engaged with and secured against the rim of the baking pan. The cake batter is baked while faced down and adhering to the shape of the embossed design of the removable base. After the cake batter is baked in an oven and sufficient cooling time is allotted, the baking pan can be flipped over such that the silicone removable base is now on top of the baked cake. The baking pan and removable base can be pulled upward, thereby exposing the molded design on the top of the baked cake.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
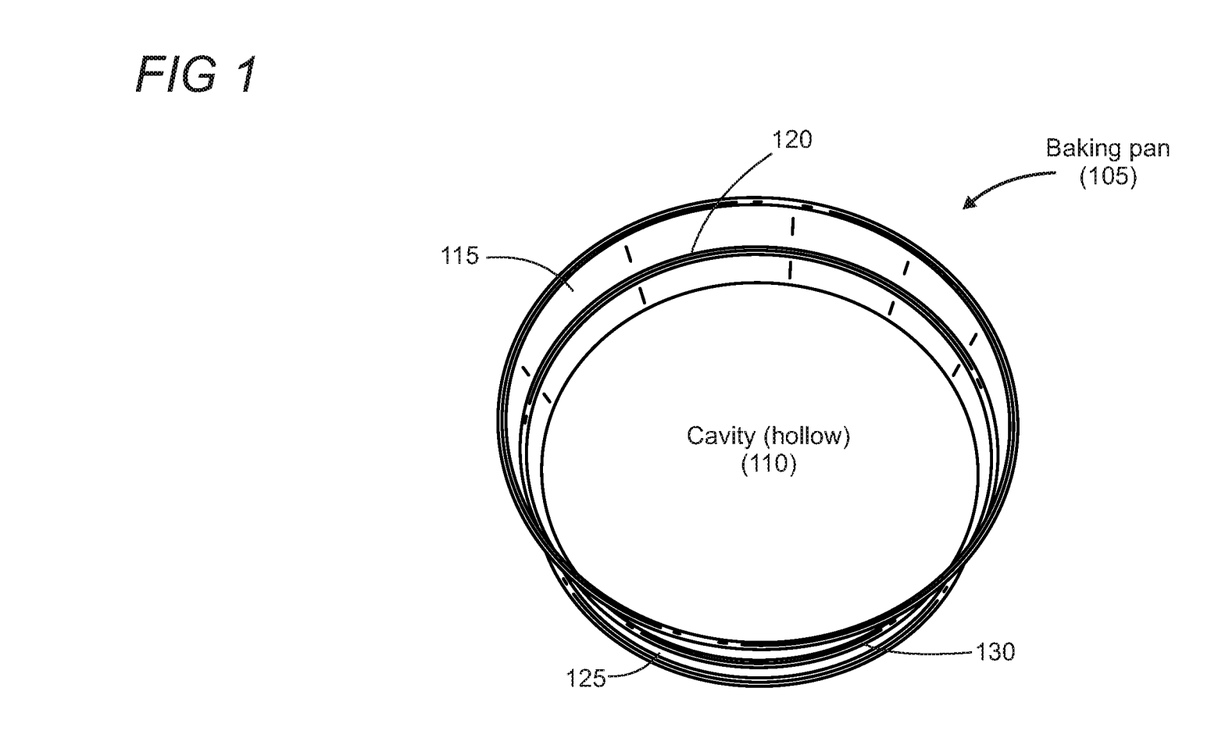
FIG. 1 shows an illustrative representation of a baking pan with a cavity in its center area.

FIG. 1 shows an illustrative representation of a baking pan 105 having a cavity 110 in the center thereof. In typical implementations, the baking pan is comprised of a metallic material, such as steel, iron, titanium, etc., but other durable materials that satisfy the purposes described herein are also possible, such as a heat-resistant plastic.

The baking pan 105 has an outside surface 125 and an interior surface 115 that is adjacent to the cavity 110. The interior surface includes a protruding rim 120 that protrudes beyond the plane of the interior surface and, as discussed in greater detail below, is used to receive and maintain a removable base. The outside surface of the baking pan includes an indentation 130 that causes the rim on the interior surface. While the outside surface shows an indentation in the surface of the baking pan that causes the protruding rim, in other implementations, the rim 120 may be attached to the interior surface via a screw, bolt, adhesive, etc.

Figure 2:
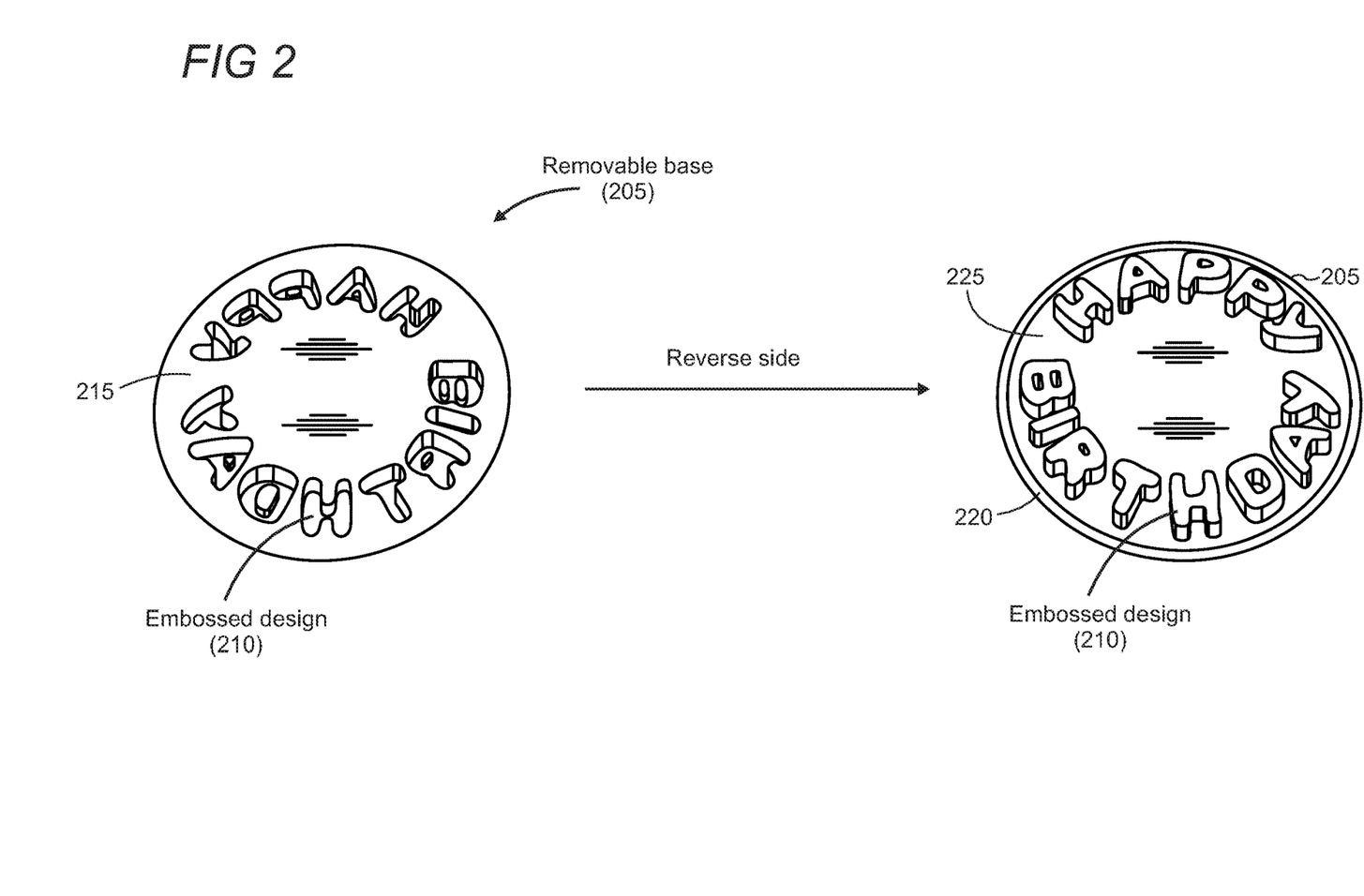
FIG. 2 shows an illustrative representation of a removable base with an embossed design.

FIG. 2 shows an illustrative representation of a removable base 205 which can be used within the baking pan 105 (FIG. 1). The reverse side of the base is also shown for clarity in understanding the base. In typical implementations, the removable base may be comprised of a heat-resistant silicone that can withstand temperatures inside an oven, but other materials are also possible, such as a heat resistant plastic. The removable base includes an embossed design 210 that extends beyond a plane 225 of the base and forms a hollow plateau in the plane 215 on the reverse side. The removable base has a lip 220 around its perimeter which engages with the interior surface 115 and rim 120 of the baking pan.

As discussed in greater detail below, the embossed design 210 translates to the cake while being baked. For example, in the design shown in FIG. 2, the embossed design can cause a protruding design from the cake. With slogans, words, and alpha-numeric characters, the removable base 205 typically will not be suitable for reversible use as the final design in the cake would be backwards. However, for images and other designs of objects or animals, the removable base may be reversibly used such that the final mold of the cake can protrude from the cake or be imprinted into the cake.

Figure 3:
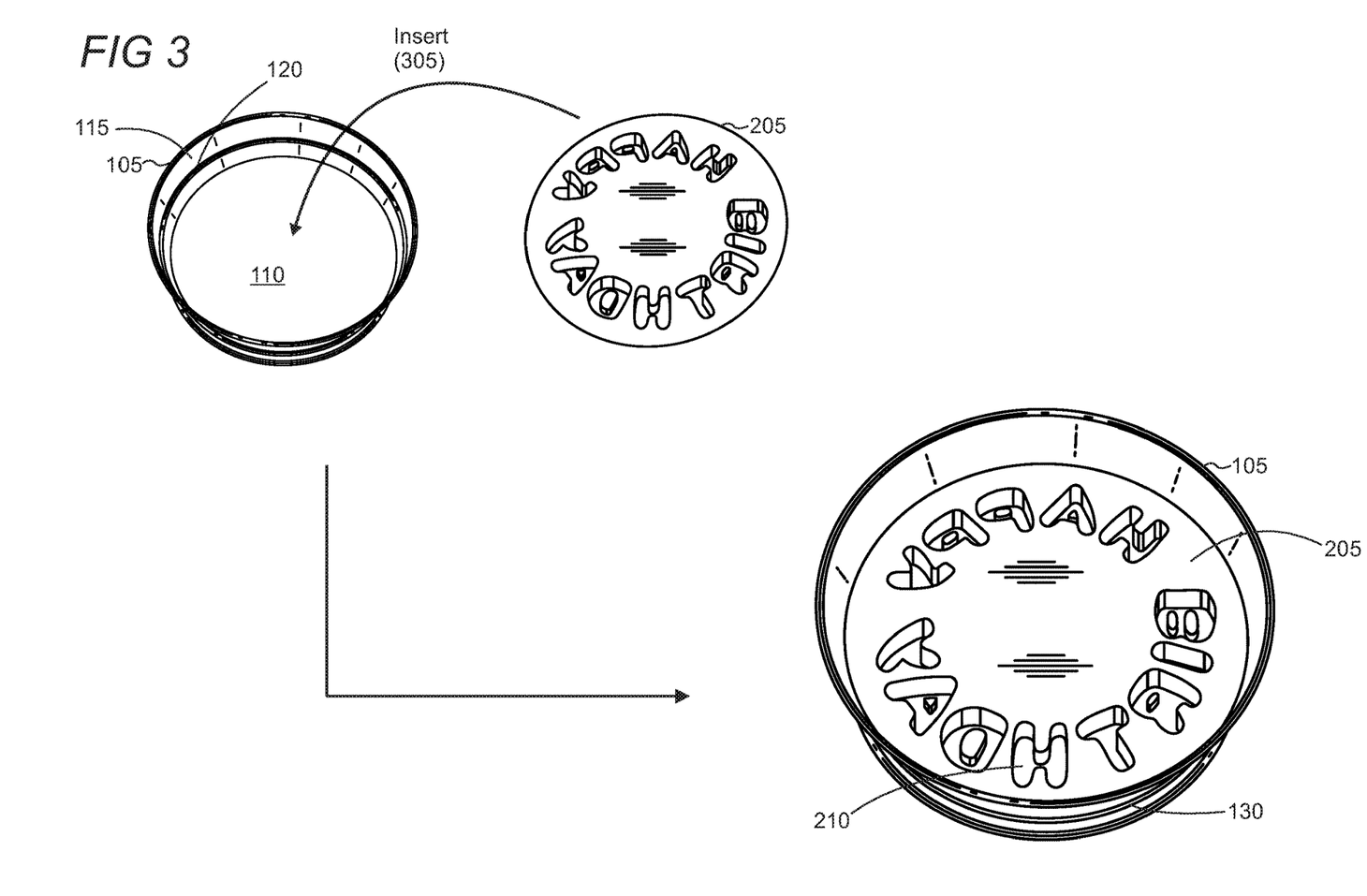
FIG. 3 shows an illustrative representation in which the removable base is placed inside the baking pan.

FIG. 3 shows an illustrative representation in which the removable base 205 is inserted inside the cavity 110 of the baking pan 105, as representatively illustrated by numeral 305. The base rests on the rim 120 on the interior surface 115 of the baking pan. The positioning of the rim in between a top side and bottom side of the baking pan can vary depending on the implementation. In the current scenario, the rim may be a distance above the bottom side so that the deep embossed design of the removable base does not extend beyond the bottom of the baking pan.

Figure 4:
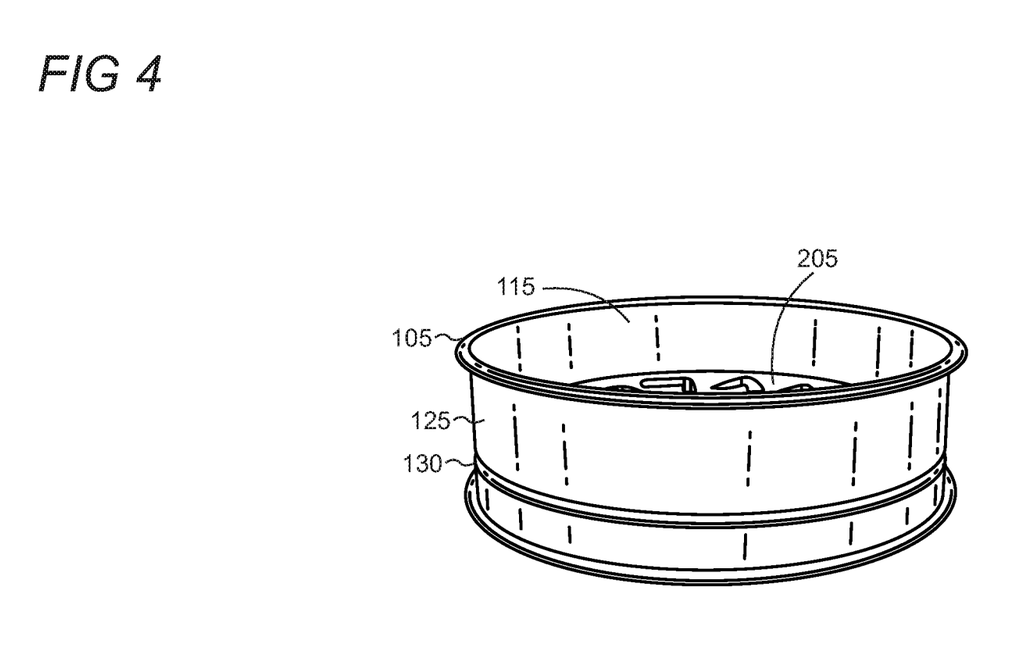
FIG. 4 shows an illustrative representation of the removable base secured inside the cavity of the baking pan.

The size and shape of the removable base 205 substantially corresponds to a shape and size of a perimeter of the cavity 110 and the area of the interior surface 115 to provide a substantial seal between the edge of the base and the interior surface of the baking pan 105, as shown in FIGS. 3 and 4. As discussed in greater detail below, the removable base with the baking pan is constructed such that cake batter can be poured into the base. When the baking process is complete, the baking pan is flipped over so that the design from the removable base is imprinted into the top of the cake. Put differently, the bottom base designs a top of the cake after the baking pan is flipped over.

While the drawings illustrate one particular use of the baking pan 105 and removable base 205, other customizations are possible. For example, the baking pan can be reversible such that the user can make a smaller cake by inserting the base on the smaller side of the baking pan. Instead of using the side adjacent to the rim with the larger surface area for the cake, the user can use the smaller side to create a design into a smaller cake.

Figure 5A:
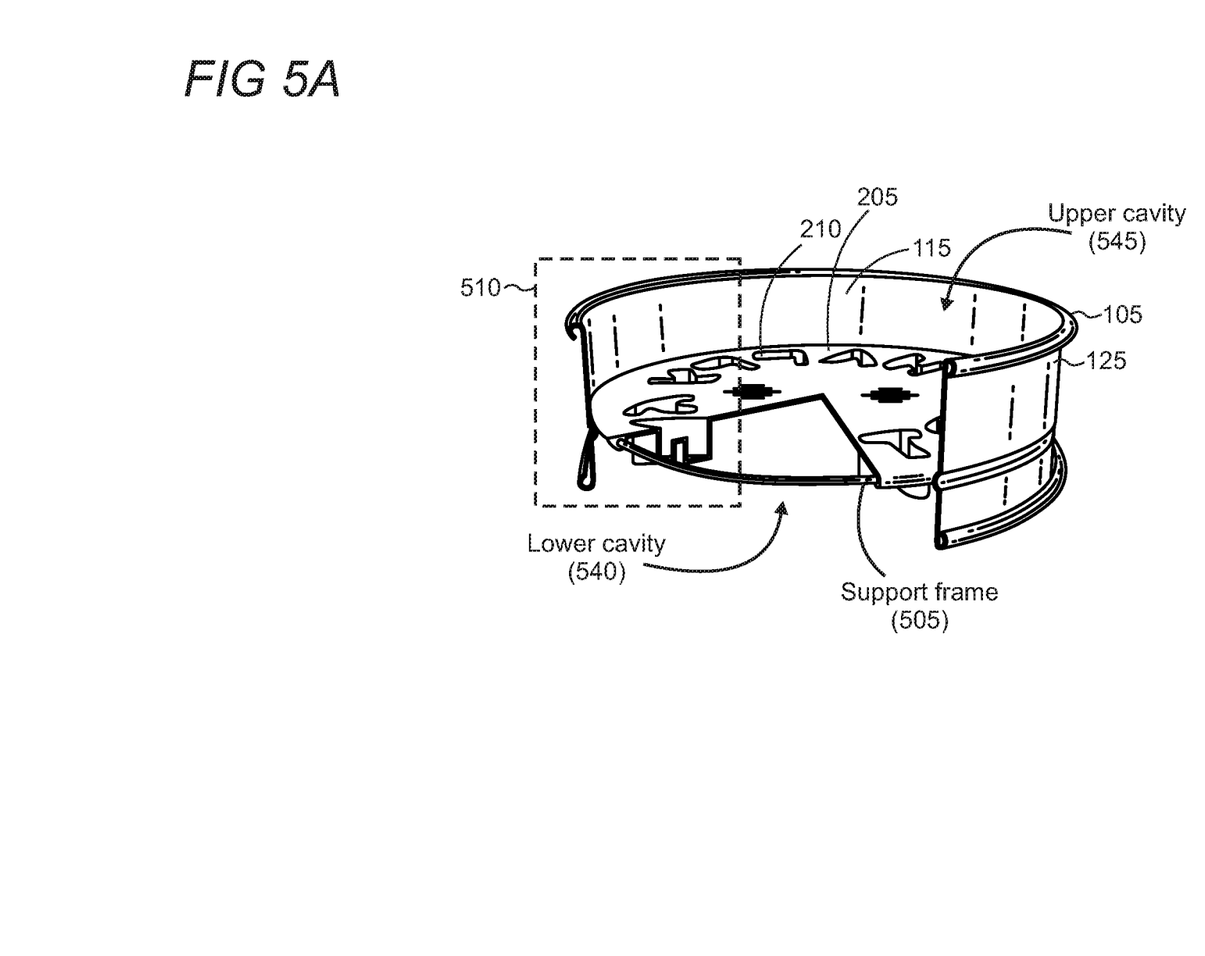
FIG. 5A shows an illustrative representation of a support frame inside the removable base and the removable base resting on a rim of the baking pan.
Figure 5B:
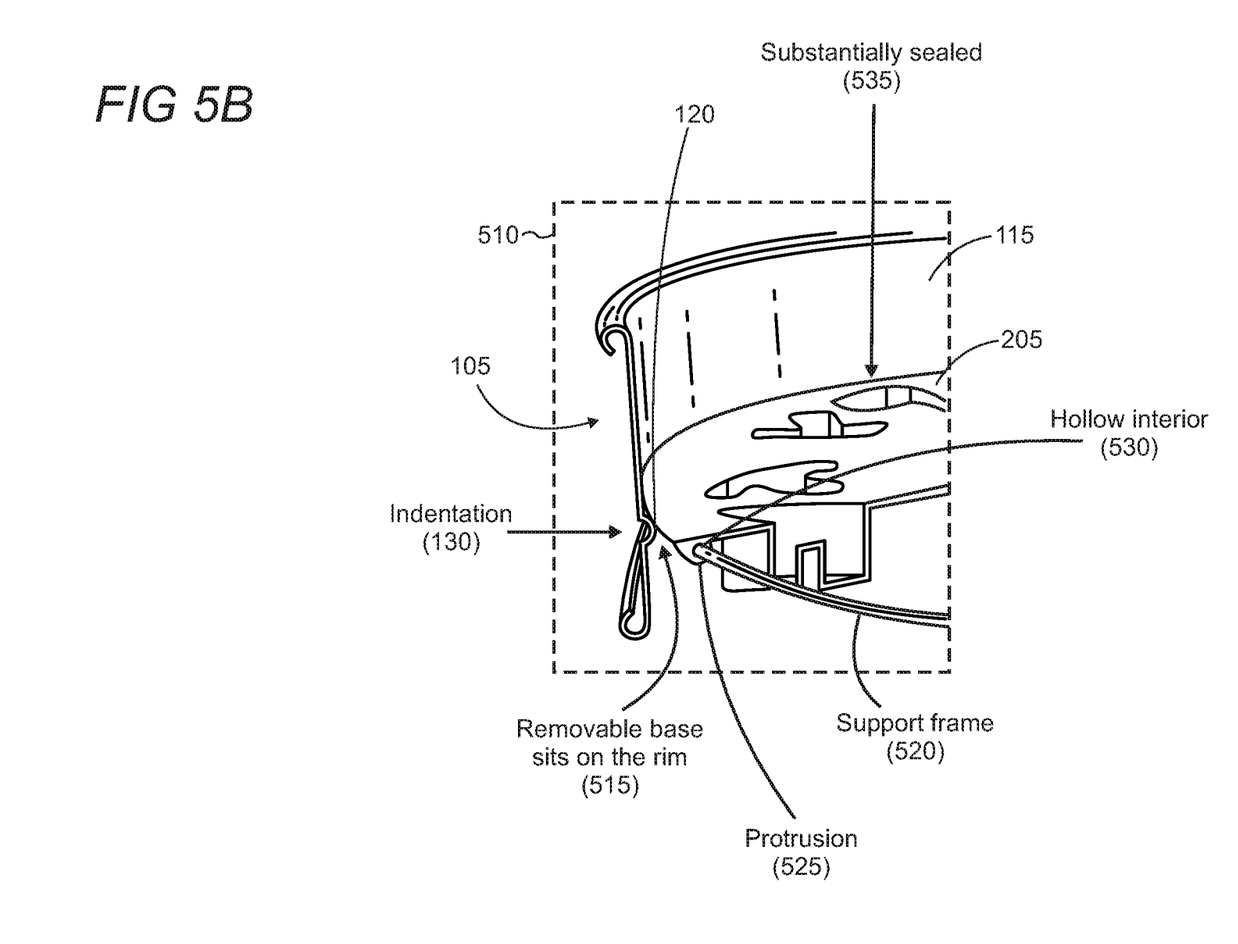
FIG. 5B shows an illustrative representation shows a detailed view of a portion of the drawing from FIG. 5A.

FIG. 5A shows an illustrative representation in which portions of the baking pan and removable base are cut-out to expose their structural configuration. FIG. 5B shows a detailed view of the box 510 from FIG. 5A. As shown in FIGS. 5A and 5B, the removable base 205 sits on the rim 120 of the interior surface 115 of the baking pan 105, as representatively shown by numeral 515. The rim secures the base in place when, for example, cake batter is poured into the base and baking pan for baking. The shape and size of the removable base to the interior surface of the baking pan provides a substantially sealed 535 environment so that only a limited amount, if any, cake batter can seep through.

When the removable base 205 is secured to the rim 120 of the baking pan 105, the cavity 110 (FIG. 1) becomes split in two such that a lower cavity 540 and upper cavity 545 are created. The upper cavity will be used for the cake batter, when poured into the baking pan. The lower cavity—the size of which is dependent on specific placement of the rim—is present to accommodate the embossed design 210 which extends downward. Without the lower cavity, the embossed design may extend below the bottom of the baking pan which would allow a countertop or other external base to obstruct the baking pan's intended functionality. While the figures depict one exemplary size for the embossed design and lower cavity, other implementations may create varying sized lower cavities and embossed designs depending on product-preference.

The removable base 205 further includes a support frame 520 that fits within a hollow interior 530 of the removable base. In typical implementations, the support frame is shaped like a wire and extends entirely around the removable base to form a complete circle. The removable base includes a protrusion 525 from the base that accommodates the support frame, in which the protrusion also extends around the entire base to form a circle. The support frame may be completely enclosed and sealed inside the protrusion of the removable base. The support frame may be at or adjacent to an edge of the removable base to provide sufficient support to the removable base during use, such as baking.

The support frame 520 is implemented to suspend the base 205 more securely into the rim 120 and against the interior surface 115, and thereby to prevent deformation of the silicone base and embossed design. The removable base sits on the rim which creates the lower cavity 540 and upper cavity 545. The support frame enhances stability—and thereby prevents instability—of the removable base to ensure that the embossed design is properly translated into the cake batter. Otherwise, the silicone removable base can tip over or be uneven when cake batter is poured into the baking pan, which can cause an erratic and off-set design in the cake.

Figure 6:
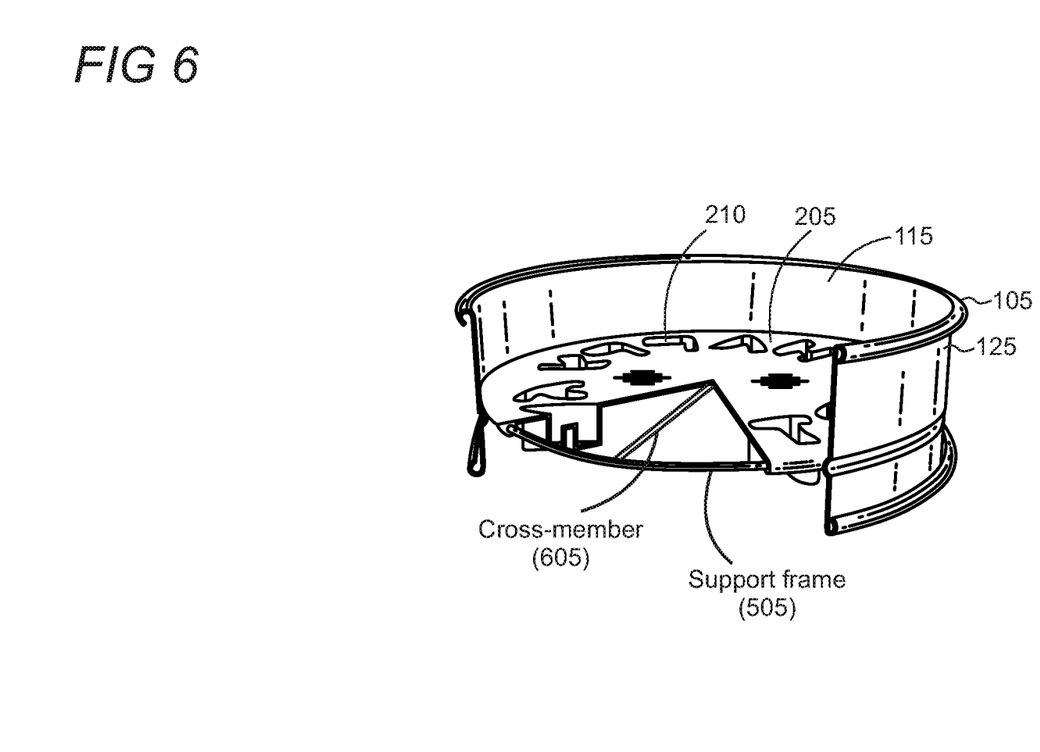
FIG. 6 shows an illustrative representation of a cross-member being used with the removable base.

FIG. 6 shows an illustrative representation in which the removable base 205 includes a cross-member 605 that complements the support frame 505 to provide additional support to the silicone base. The cross-member may be constructed into the removable base similarly as the support frame described above. For example, the cross-member may extend within a hollow interior of a protrusion extending from a plane of the removable base. The cross-member may extend from one end of the support frame to an opposite end thereof. While a single cross-member is depicted in FIG. 6, additional cross-members of varying patterns may be implemented depending on the scenario. For example, cross-members may be arranged perpendicular to each other, cross-members may be arranged in series and parallel to each other, among other arrangements.

Figure 7:
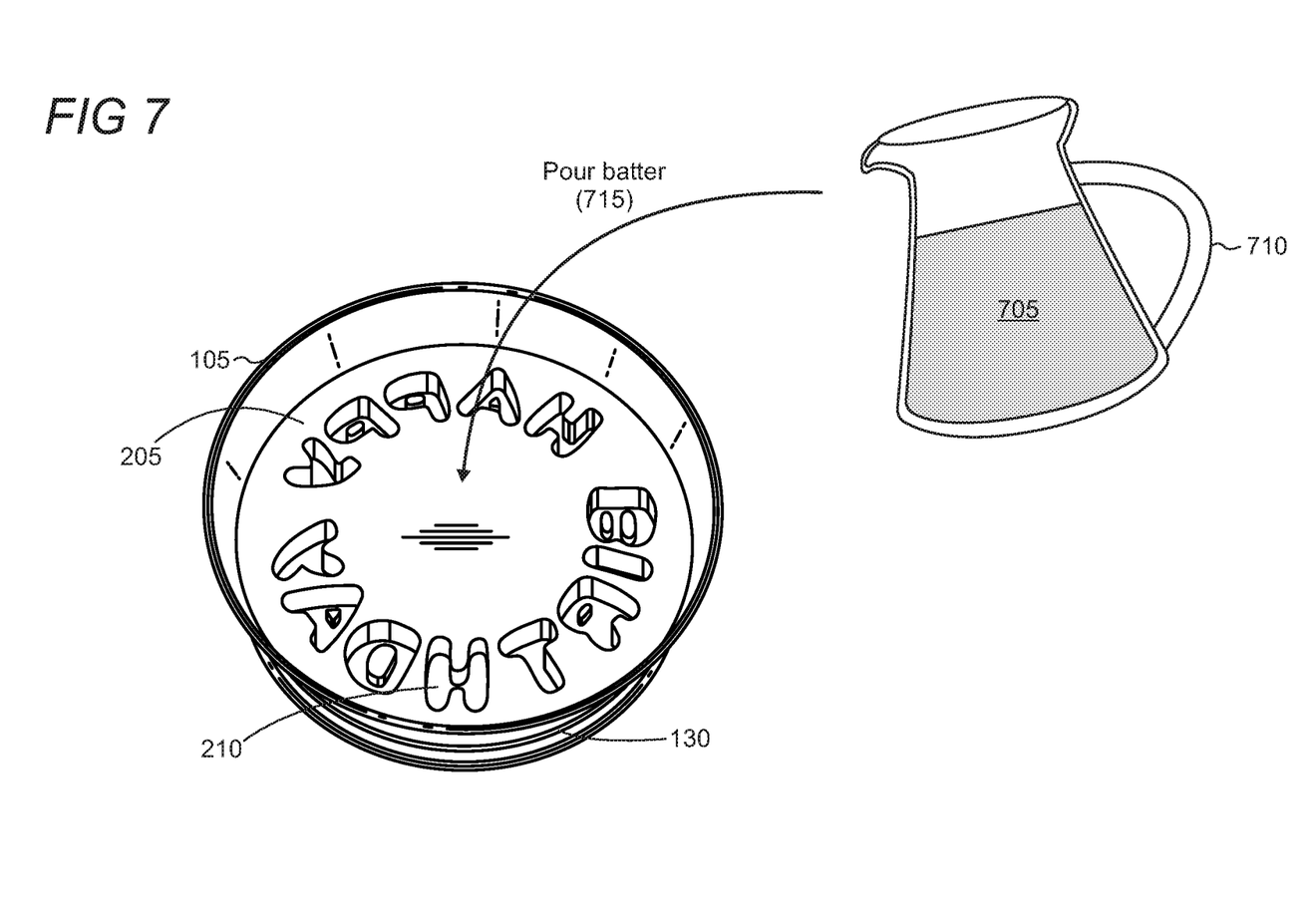
FIG. 7 shows an illustrative representation in which baking batter is poured within the baking pan with the removable base secured therein.

FIG. 7 shows an illustrative representation in which cake batter 705 from a pouring container 710 is poured into the baking pan 105 with removable base 205, as representatively shown by numeral 715. In this implementation, the embossed design 210 is facing downwards. The cake batter would fill up the letters of the embossed design, spelling "HAPPY BIRTHDAY," and then continue to fill up the cavity 110 (FIG. 1) of the baking pan's interior.

While cake batter is illustrated and used as a reference herein, other uses are also possible. For example, the baking pan 105 and removable base 205 can be used to create cold confections. Similarly, the baking pan may have different designs, such as tapered sides, to make pies and flans. In any case, the implementation of a rim extending around an interior surface of the baking pan, used in connection with a removable and silicone base, can be leveraged to create designs into the desired product.

Figure 8:
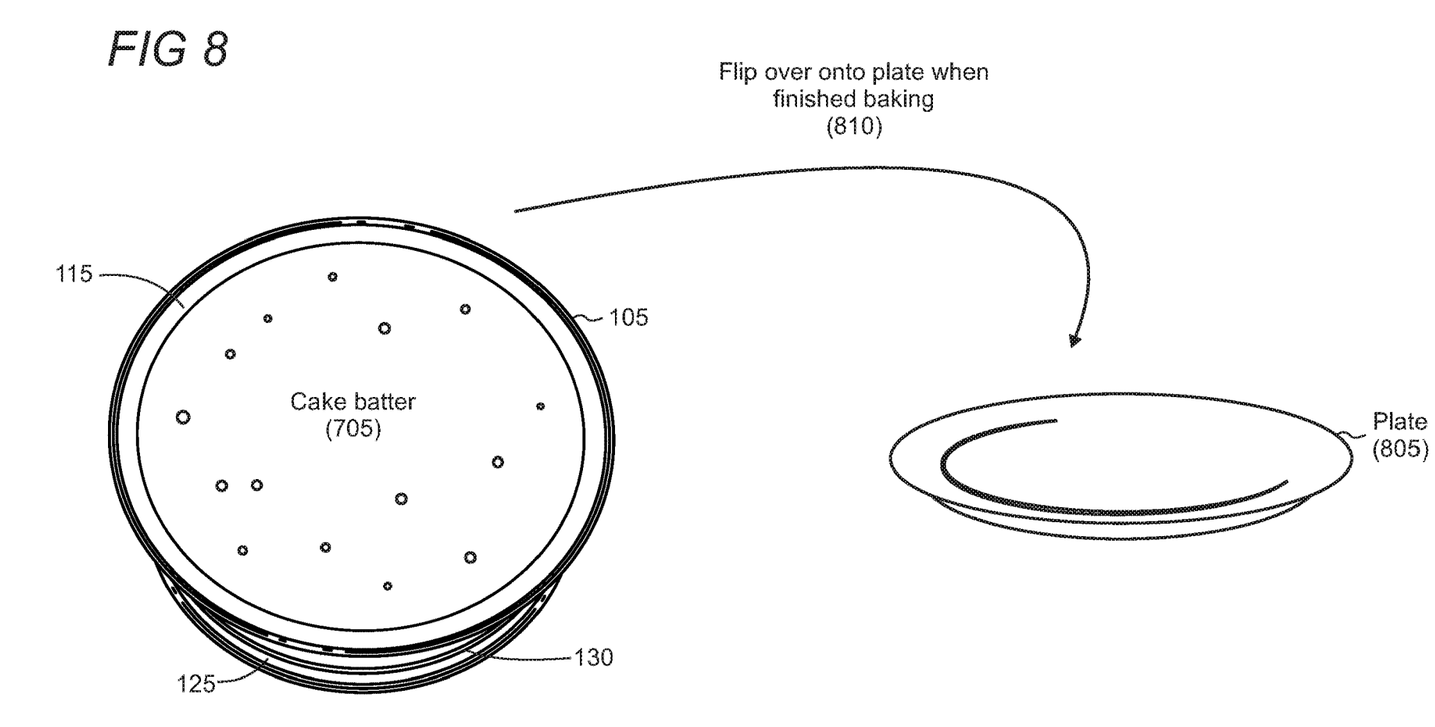
FIG. 8 shows an illustrative representation in which the baked cake batter is flipped over and placed onto a plate when the cake is finished baking.

FIG. 8 shows an illustrative representation in which the cake batter 705 is fully poured into the baking pan's interior cavity on top of the removable base 205. Once the baking pan, removable base, and cake batter are baked in an oven at a suitable temperature, the user, after waiting a proper cooling period, can flip over the baking pan and its contents onto a plate 805, as representatively illustrated by numeral 810. In typical implementations, the plate may be placed on top of the baking pan before being flipped over.

Figure 9:
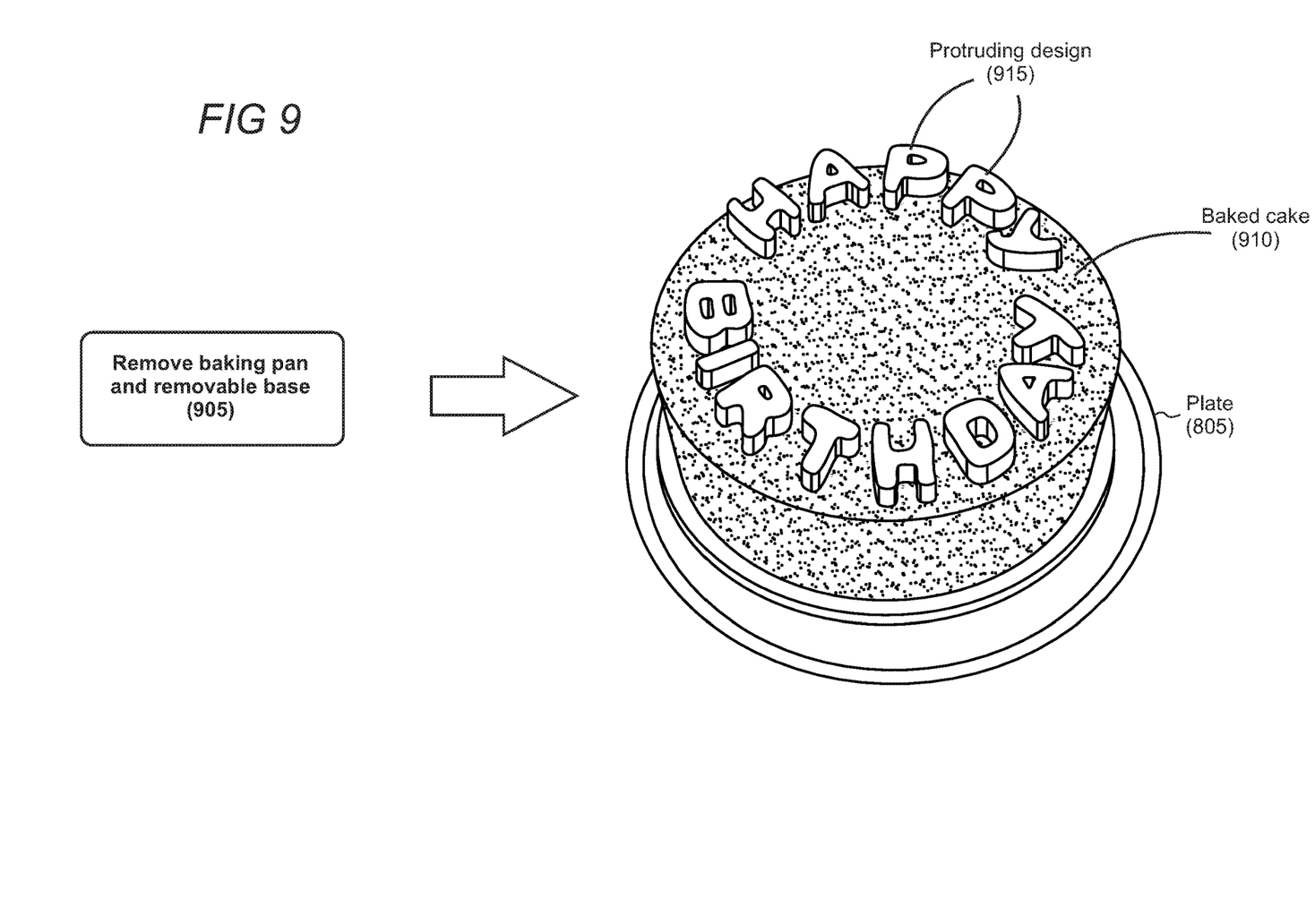
FIG. 9 shows an illustrative representation of the finished cake with an protruding design from the removable base.

FIG. 9 shows an illustrative representation of the baked cake 910 after removing the baking pan and removable base, at step 905. The baked cake depicts the protruding design 915, "HAPPY BIRTHDAY," protruding outward from the cake in a three-dimensional (3D)-type manner. By using the heat-resistant silicone material with the support frame 525 against the baking pan interior surface's rim 120, the cake batter is able to accurately reflect the embossed design, when baked. With other structural materials, such as if the support frame was missing or if certain other materials for the embossed base was used, the base could tip over or otherwise become unlevel during the baking process. In contrast, the specific construction in combination with the choice of materials described herein enables a fully translatable embossed design from the removable base to the cake.

Figure 10:
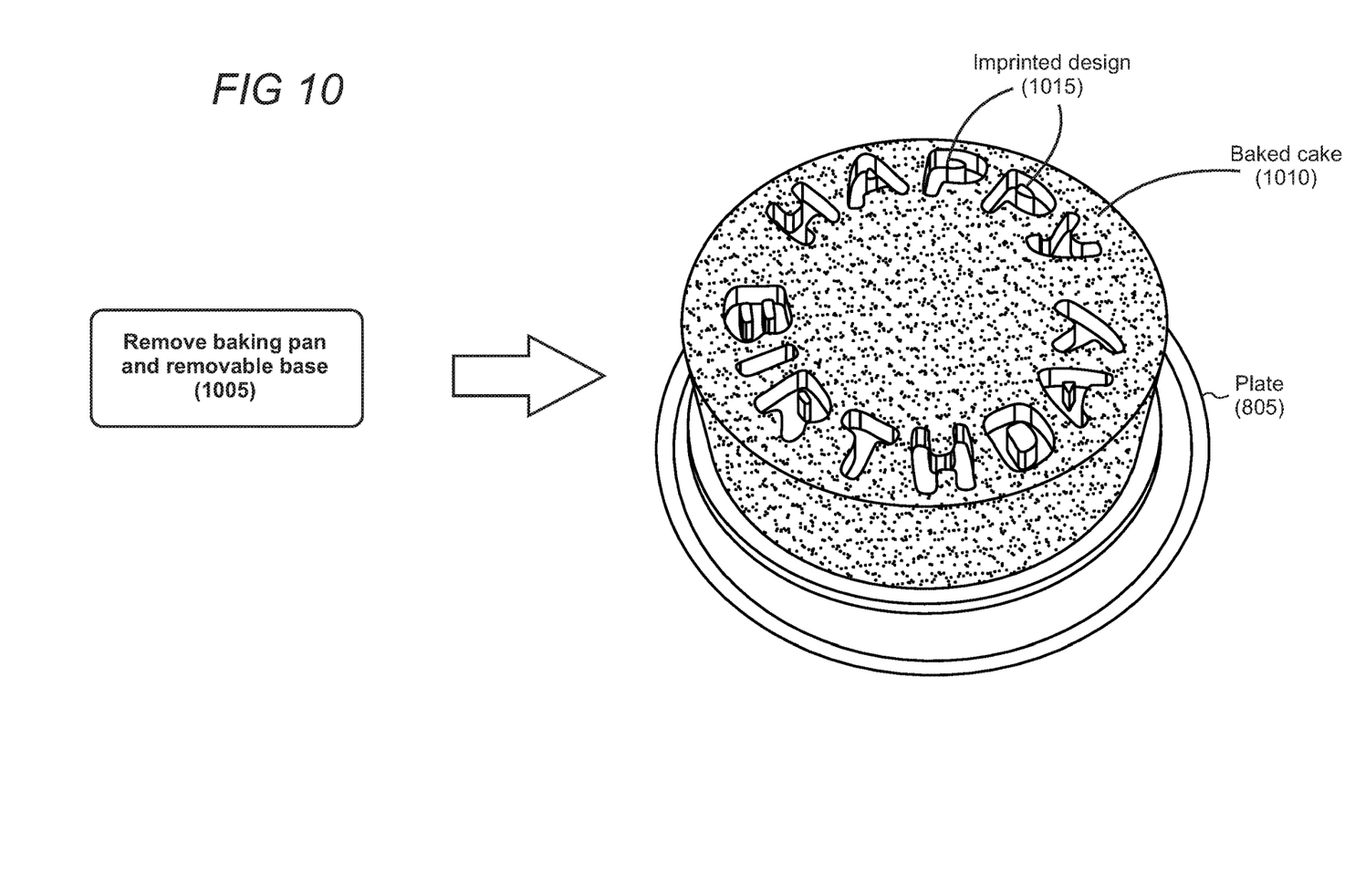
FIG. 10 shows an illustrative representation of the finished cake with an imprinted design from the removable base.

FIG. 10 shows an illustrative representation of the baked cake 1010 after removing the baking pan and removable base, at step 1005. In this scenario, a different removable base 205 from FIG. 7 was used such that the embossed design faced upwards to provide an imprint into the cake. The lettering would be similar as the removable base 205 in FIG. 7, but would be facing upward to be molded and imprinted into the cake. Simply reversing the removable base from FIG. 7 would result in a backwards translation to the cake, so, typically, only images and other pictures may be adapted for reversible use. As shown, the baked cake depicts the imprinted design 1015, "HAPPY BIRTHDAY," imprinted into the cake's surface area in a 3D-type manner. Similar to the discussion above with respect to FIG. 9, the specific construction of the baking pan and removable base, in combination with the choice of materials, enables a fully translatable embossed design from the removable base into the cake.

Figure 11:
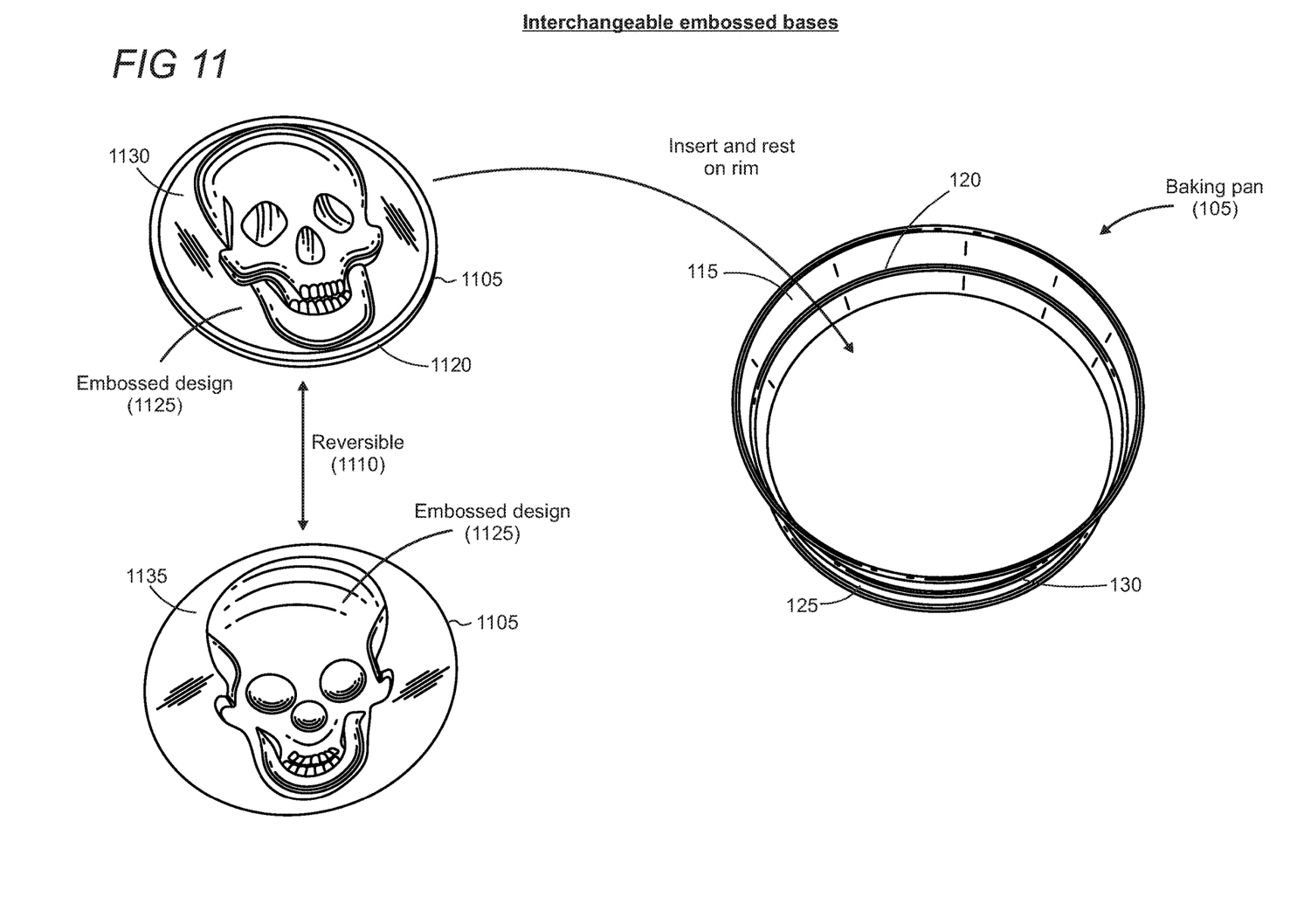
FIG. 11 shows an illustrative representation in which removable bases with alternative embossed designs can be interchangeably used with the baking pan.

The baking pan and removable base described above works with varying sized and shaped components, including different sized baking pans and correspondingly different sized removable bases. FIG. 11 shows an illustrative representation of interchangeable embossed bases that can be utilized with the same baking pan 105. For example, the removable base 1105 can have an embossed design 1125 of a skull that protrudes upward from a plane 1130. On the reverse side, the embossed design forms a hollow plateau from the plane 1135 to create the reversible 1110 base for either a protruding design or imprinted design (FIGS. 9 and 10). An edge, or lip, 1120 of the removable base is present to simultaneously engage with the baking pan's interior surface 115 and rim 120 to provide a substantially sealed environment and prevent cake batter from seeping through. In short, while removable bases may have different embossed designs, their construction is otherwise similar to that described herein and shown in, for example, FIGS. 3-6.

Figure 12:
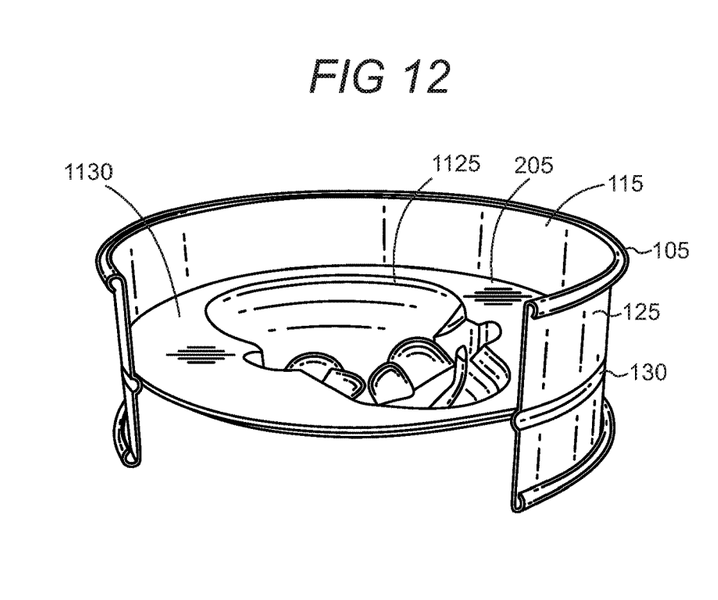
FIGS. 12 and 13 show an illustrative representations of the removable base with the skull design being utilized with the same baking pan.
Figure 13:
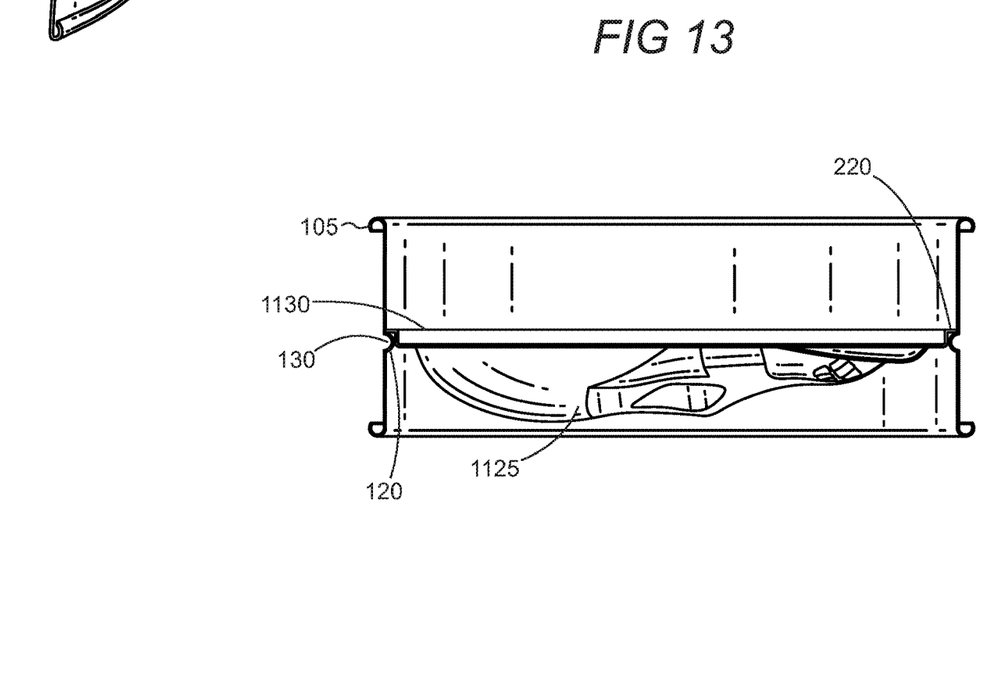

FIGS. 12 and 13 show different angles of the removable base 1105 that has the different design from removable base 205. The interchangeable designs enable the commercial and average home baker the opportunity to utilize a single baking pan with various cake designs. While "HAPPY BIRTHDAY" and a skull design are shown herein, other designs and slogans for the removable base are also possible, such as "MERRY CHRISTMAS," an image of an airplane, among other designs.

FIG. 13 shows the removable base 1105 with the shape of a skull sitting on the rim 120. As described above, the structural configuration provides the stability and level baking with a variable pattern or shape. The design herein provides sufficient structural integrity to the base to provide an effortless baking experience when translating any given design to a cake.

Figure 14:
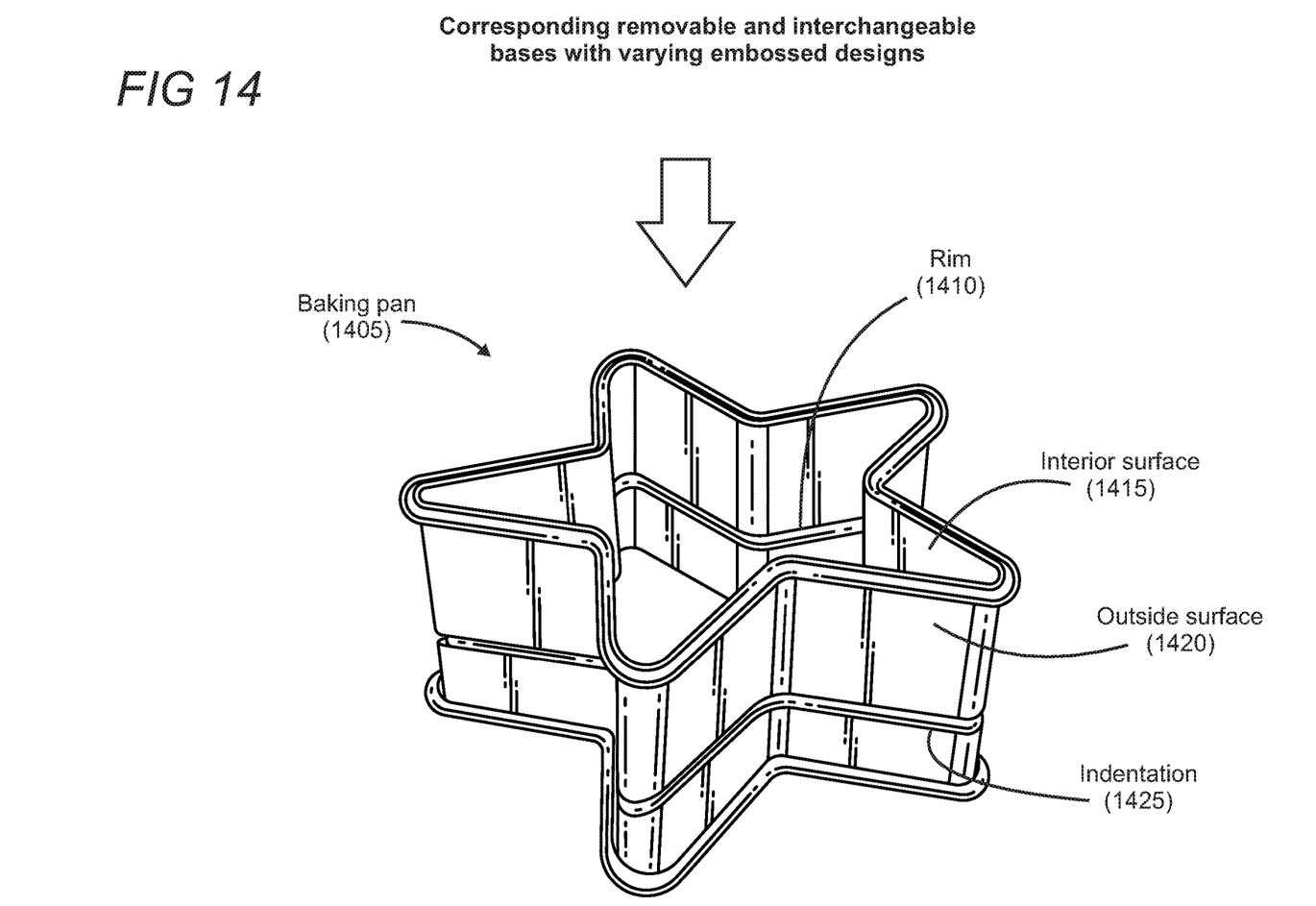
FIG. 14 shows an illustrative representation of an alternatively designed baking pan with similar implementation features as the circular baking pan.

Similarly, while interchangeable removable bases can be used with a single baking pan shape, alternative baking pan shapes and sizes are also possible. FIG. 14 shows an illustrative representation of a star-shaped baking pan 1405 with a similar construction of the round baking pan 105 described above. For example, the rim 1410, interior surface 1415, outside surface 1420, and indentation 1425 can all be adapted for use with the star-shaped baking pan and other shaped and sized baking pans.

Using the star-shaped baking pan, correspondingly shaped and sized removable and interchangeable bases having varying embossed designs can likewise be used with the baking pan. For example, one embossed design with the star may be a smiley face that shows the star smiling in a baked cake. Another embossed design, with a different and interchangeable removable base, can be a star shape with fireworks imprinted into or protruding outward from the cake. Therefore, a single baking pan can facilitate the creation of an ecosystem of designs for removable bases and thereby cakes.

Other constructions for baking pans and removable bases can include varying shapes such as a square, rectangle, and other polygons, ovals, or other objects and things like a truck, animal (e.g., bear, dog, cat), etc. The example designs herein are non-exhaustive and can be leveraged with the structure of the baking pan and removable base described herein.

Various embodiments of the disclosure are now presented. In one embodiment, a baking pan that utilizes an embossed base for creating molded cakes is disclosed, in which the baking pan comprises: a cavity in a center of the baking pan; an interior surface of the baking pan that is adjacent to the cavity, wherein the interior surface includes a rim; and the embossed base having an embossed design on one side and which engages with the rim, wherein the engaged embossed base and rim are secured together to create a level surface at the embossed base.

In another example, the cavity extends from a top side to a bottom side of the baking pan. As another example, the embossed base is comprised of silicone and the baking pan is comprised of metal. As another example, the embossed base is reversible in which each side of the embossed base engages with and secures to the rim. In another example, the embossed design of the embossed base is hollow, such that the embossed base can create an indented design into or protruding design outside of a cake depending on its directional placement into the baking pan. As another example, the embossed base is shaped and sized to create a substantial seal with the interior surface of the baking pan and thereby substantially prevent baking contents, including cake mix, from seeping through. In another example, the baking pan further comprises a support frame inside of the embossed base, in which the support frame prevents deformation of the embossed design and provides support for the level surface when the embossed base is engaged with the interior surface's rim. As another example, the support frame is completely enclosed inside the embossed base's silicone composition. In a further example, the embossed base includes a protrusion having a hollow interior, inside which accommodates the support frame, and a lip of the embossed base extends beyond the protrusion. In a further example, the support frame is a wire. In a further example, the embossed base's protrusion is on a same side as the embossed design on the embossed base.

In another embodiment, disclosed is a baking pan, comprising: an interior surface having a rim positioned between a top side and a bottom side of the baking pan; a cavity adjacent to the interior surface and which extends from the top side to the bottom side of the baking pan; and a removable base that is shaped and sized to fit within the interior surface's area and which engages with the interior surface's rim, wherein the removable base includes a support frame that prevents deformation of the removable base and provides leveling support for when the removable base is in use within the baking pan.

As another example, the removable base includes a lip along its perimeter, in which the lip engages with the interior surface's rim and interior surface. As a further example, the removable base includes an embossed design that protrudes from one side of the removable base, wherein the removable base is reversible such that the removable base engages with the rim whether the embossed design faces downward or upward within the baking pan. In another example, the baking pan further comprises a second removable base that is likewise shaped and sized to fit within the interior surface's area and which includes a different embossed design. As another example, the embossed design of the removable base is hollow, such that the removable base's embossed design can create an indented design into or protruding design outward from a cake depending on its directional placement into the baking pan. In another example, the rim is a protrusion that extends into the baking pan's cavity.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A baking pan that utilizes an embossed base for creating molded cakes, comprising:
    a cavity in a center of the baking pan;
    an interior surface of the baking pan that is adjacent to the cavity, wherein the interior surface includes a rim;
    the embossed base at least partially comprised of silicone and having an embossed design on at least one side, the embossed base adapted to engage with the rim of the baking pan's interior surface, wherein the embossed base and rim are engaged together to create a level surface at the embossed base,
    wherein the embossed design of the embossed base is hollow, such that the embossed base is adapted to create an indented design into or protruding design outside of a cake depending on the embossed base's directional placement into the baking pan's interior surface,
    wherein the embossed base is shaped and sized to create a substantial seal with the interior surface of the baking pan and thereby substantially prevent baking contents, including cake mix, from seeping through; and
    a support frame inside of the embossed base, in which the support frame prevents deformation of the embossed design and provides support for the level surface when the embossed base is engaged with the interior surface's rim.

2. The baking pan of claim 1, wherein the cavity extends from a top side to a bottom side of the baking pan.

3. The baking pan of claim 1, wherein the embossed base is comprised entirely of silicone and the baking pan is comprised of metal.

4. The baking pan of claim 1, wherein the embossed base is reversible in which each side of the embossed base is adapted to engages with and secures to the rim.

5. The baking pan of claim 1, wherein the support frame is completely enclosed inside the embossed base's silicone composition.

6. The baking pan of claim 5, wherein the embossed base includes a protrusion having a hollow interior, inside which accommodates the support frame, and a lip of the embossed base extends beyond the protrusion.

7. The baking pan of claim 6, wherein the support frame is a wire.

8. The baking pan of claim 6, wherein the embossed base's protrusion is on a same side as the embossed design on the embossed base.

9. A baking pan, comprising:
    an interior surface having a rim positioned between a top side and a bottom side of the baking pan;
    a cavity adjacent to the interior surface and which extends from the top side to the bottom side of the baking pan; and
    a removable base comprised of silicone and which is shaped and sized to fit within the interior surface's area and which engages with the interior surface's rim to provide a sealed environment between the removable base and the rim, wherein the removable base includes a support frame, completely enclosed within the removable base's interior, that prevents deformation of the removable base and provides leveling support for when the removable base is in use within the baking pan's interior surface.

10. The baking pan of claim 9, wherein the removable base includes a lip along its perimeter, in which the lip engages with the interior surface's rim.

11. The baking pan of claim 10, wherein the removable base includes an embossed design that protrudes from one side of the removable base, wherein the removable base is reversible such that the removable base engages with the rim whether the embossed design faces downward or upward within the baking pan.

12. The baking pan of claim 11, further comprising a second removable base that is likewise shaped and sized to fit within the interior surface's area and which includes a different embossed design.

13. The baking pan of claim 11, wherein the embossed design of the removable base is hollow, such that the removable base's embossed design is adapted to create an indented design into or protruding design outward from a cake depending on its directional placement into the baking pan.

14. The baking pan of claim 9, wherein the rim is a protrusion that extends into the baking pan's cavity.

\* \* \* \* \*